United States Patent

Hu et al.

[11] Patent Number: 5,966,194
[45] Date of Patent: Oct. 12, 1999

[54] METHOD OF MAKING COUNTER ELECTRODE FOR LIQUID CRYSTAL DISPLAYS

[75] Inventors: Dyi-Chung Hu, Hsinchu Shein; Sheng-Heisn Lin, Tainan Shein; Tai-Kang Wu, Hsinchu; Sywe N. Lee, Nei-Hu Taipei, all of Taiwan

[73] Assignee: Prime View International Co., Hsinchu, Taiwan

[21] Appl. No.: 08/605,958

[22] Filed: Feb. 23, 1996

[51] Int. Cl.$^6$ ................... G02F 1/1345; G02F 1/1339
[52] U.S. Cl. ..................... 349/153; 349/149; 349/156
[58] Field of Search ................... 359/80, 88, 81; 156/330; 349/153, 156, 149

[56] References Cited

U.S. PATENT DOCUMENTS

| | | | |
|---|---|---|---|
| 5,042,919 | 8/1991 | Yabu et al. | 359/88 |
| 5,087,314 | 2/1992 | Sanborn et al. | 156/330 |
| 5,317,438 | 5/1994 | Suzuki et al. | 359/88 |
| 5,406,164 | 4/1995 | Okawa et al. | 310/88 |
| 5,556,670 | 9/1996 | Mihara et al. | 359/80 |

*Primary Examiner*—William L. Sikes
*Assistant Examiner*—Julie Ngo
*Attorney, Agent, or Firm*—H. C. Lin

[57] ABSTRACT

The display area of a liquid crystal display cell is increased by placing conductive epoxy within the boundary which seals the liquid crystal to connect the top glass plate with the bottom glass plate, in contrast with the conventional method of making the electrical connection outside the display area. The conductive epoxy is dispensed in areas not occupied by the liquid crystal patterns. The conductive epoxy can be in the form of particles of spheres or rods serving as spacers for maintaining the gap dimension between the two glass plates. The conductive epoxy can also be integrated with the boundary sealing epoxy or fill a notch cut in the boundary sealing epoxy.

6 Claims, 2 Drawing Sheets

6

METHOD OF MAKING COUNTER ELECTRODE FOR LIQUID CRYSTAL DISPLAYS

BRACKGROUND OF THE INVENTION

This invention relates to liquid crystal (LC) displays, in particular, to a method of making counter electrodes for liquid crystal cells.

A liquid crystal display device is composed of glass substrates with electrical conducting patterns. The paired glass substrates, indicated as Top glass 1 and Bottom glass 1' in FIG. 1 each having an orientation film, are arranged opposite to each other with a space defined by spacers and are sealed by an adhesive sealing material to form a cell structure. Silver paste is used as conducting material and is dispensed in prior art at specific places outside the sealing adhesive to electrically connect the two glass substrates. As shown in FIG. 1, dots of silver paste are placed at the four corners of the display. Liquid crystal is then injected into the space between the paired substrates, and the cell is sealed by ultra-violet glue. Thus the intensity of light passing through the polarizer and the liquid crystal cell can be controlled by adjusting the voltage applied to the liquid crystal cell.

The liquid crystal cells have been manufactured by the above method in mass production. However, such a conventional liquid crystal cell assembly process requires an area outside the display cell for placing dots of silver paste and a precision dispensation of silver paste into the specific places. Thus, the cell assmebly must be made larger than the display area, resulting in a sacrifice of the display area.

Another drawback of the prior art is the uneven distribution of the voltage Vcom in the counter electrode (i.e. the voltage at the Top substrate). Vcom is supplied by the LCD driving system and is fed from the Bottom substrate via the four silver dots at the four corners. Since the top electrode is made of transparent indium-tin oxide (ITO) films with finite sheet resistance (around 50 ohms/square), the voltage distribution in the film is not uniform due to ohmic drop from the silver dot at the four corners to the center of the Top substrate. This uneven voltage distribution adversely affect the optical performance of the display.

SUMMARY OF THE INVENTION

An object of this invention is to increase the effective display area of a liquid crystal cell assembly. Another object of this invention is to simplify the liquid crystal cell assemply. Still another object of this present invention is to make the voltage in the counter electrode plane more evenly distributed than prior art.

These objects are achieved by using conductive epoxy dispensed within the sealed boundary of the display to connect the top glass plate with the bottom glass plate. The conductive epoxy is dispensed as conductive particles. These particles can be shaped as spheres or rods, and serve as spacers for maintaining the gap dimension between the top and bottom glass plates. These particles can be dispensed in areas not occupied by the liquid crystals or in a notch cut in the boundary sealing epoxy. The conductive epoxy can also be integrated with the boundary sealing epoxy.

DETAILED DESCRIPTION OF THE PREFERRED EMBODIMENT

Figure 1:
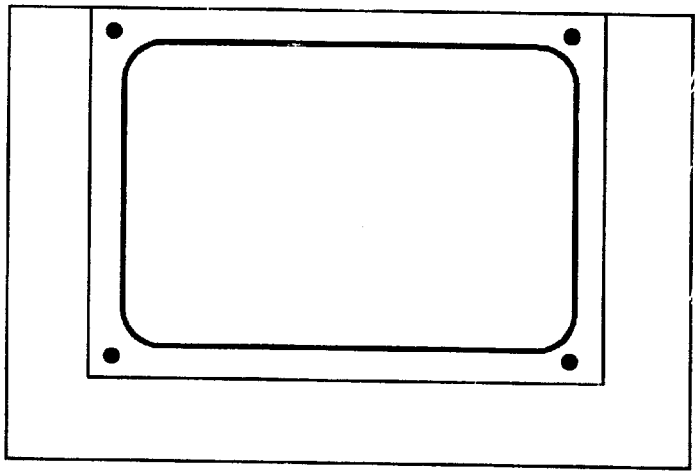
FIG. 1 shows a top view of a liquid display cell produced from prior art.
Figure 2:
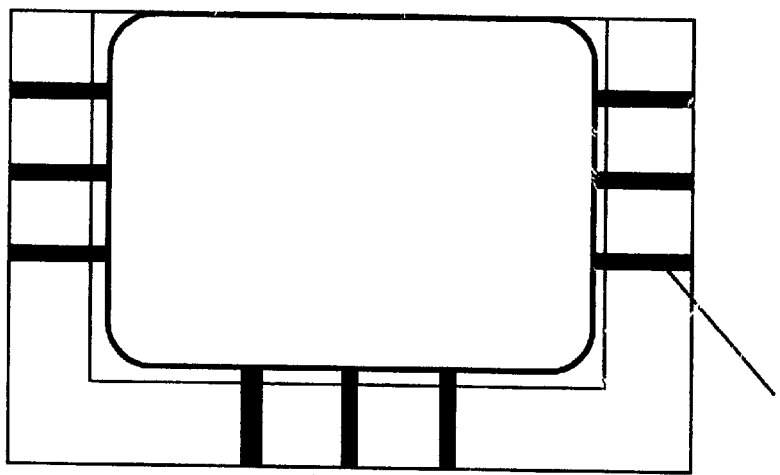
FIG. 2 shows a top view of a liquid crystal cell with the voltage Vcom at the common electrode formed by conductive dots based on the present invention.
Figure 3:
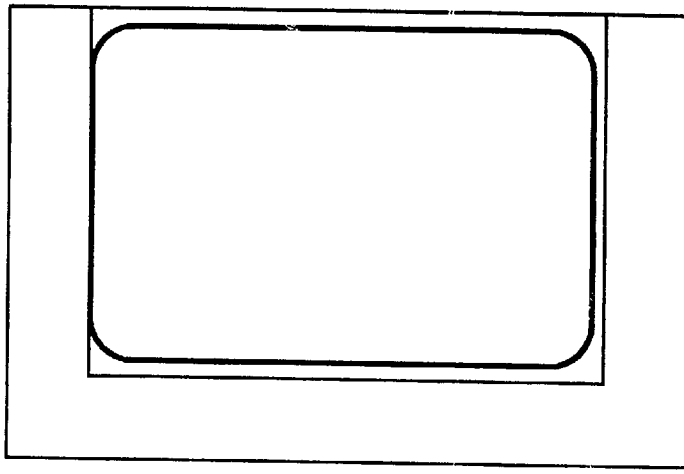
FIG. 3 shows a top view of a liquid crystal cell with the voltage Vcom at the common electrode made by conductive particles base on the present invention.

Two embodiments of the present invention are shown in FIG. 2 and FIG. 3 with a Top glass 1 and a Bottom glass 1' similar to that in FIG. 1. However, no silver dots outside the display area are used to connect the two substrates conductively. FIG. 2 shows a top view of a liquid crystal cell with voltage Vcom of the common electrode formed by conductive dots. FIG. 3 shows a top view of a liquid crystal cell with voltage Vcom of the common electrode made by conductive particles.

Figure 4:
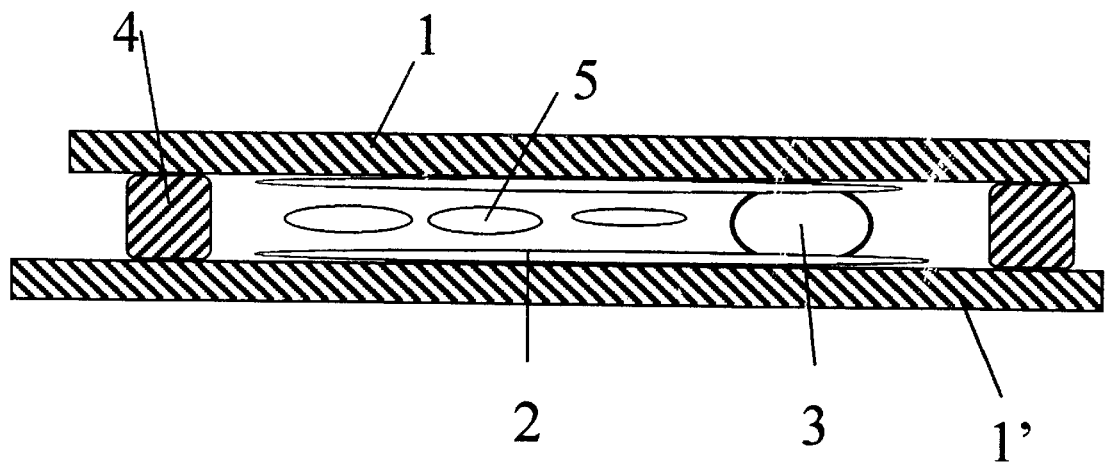
FIG. 4 shows the side view of a liquid crystal display cell based on the present invention.

FIG. 4 shows the cross section of FIGS. 2 and 3. Substrates 1 and 1' are provided with electrodes, which are coated with alignment films 2 and have undergone rubbing to align liquid crystals in a specific direction. Sealing adhesive 4 is applied to substrate 1 by screen printing or by dispenser process. In order to obtain a LC cell with a gap between two substrates, desired size spacers 3 are dispersed onto substrate 1'. The two substrates are oppositely arranged to each other like a mirror, and are substantially in parallel. The alignment films 2 may include a film of an inorganic material, such as silicon monoxide, silicon dioxide, silican nitride, aluminum oxide, magnesium fluoride, cerium fluoride and boron nitride, or an organic film, such as polyimide, polyvinyl alcohol, polyvinyl acetal, polyvinyl chloride, polystyrene, polyamide/polyamideimide, polyester, polyesterimide, polycarbonate, cellulose resin, melamine resin, urea resin and acrylic resin. The films may preferably be formed to a thickness of 50–1500 Å by a spin coating or a roller coater. The spacer beads may be made of a wide variety of known materials including alumina, silica and plastic type. A conventional liquid crystal 5, such as nematic, smetic, chiral smetic and cholesteric can be used in the present invention.

Figure 5:
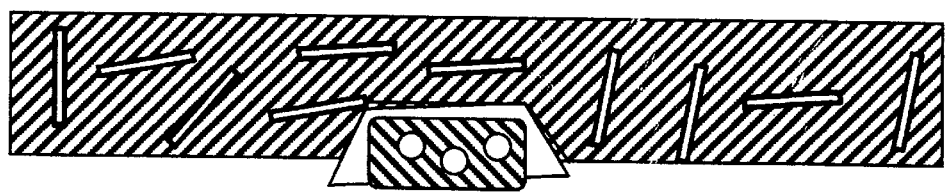
FIG. 5 is an enlarged picture of an epoxy line with a notch in the sealing epoxy before the conductive particles are compressed.

In order to increase the display size, the silver dots should be placed as closely to the epoxy as possible or ideally serve both as a seal and as a connector to the top and bottom glass plates. In the prior art shown in FIG. 1, the silver paste dots are placed at the four corners of the display, the width of epoxy seal is about 1.2 mm, and the area occupied by each of the silver dot is about 1 mm square and located at the outer edge of the seal. In the present invention, the dots of silver paste are placed near the notches of the epoxy pattern as shown in FIG. 5. The epoxy pattern with notches located at predetermined locations can be constructed by screen printing. The dots of silver paste are formed by dispensing method. Ususally, the epoxy used for the seal is premixed with rods or spheres with predetermined diameters to insure the accuracy of the cell gap. The epoxy is available from venders, such as XN-21-S from Mitsui Toastsu Chemicals.

Another advantage of the present invention is that the voltage in the counter electrode plane is more evenly distributed than the prior art shown in FIG. 1. According to the present invention, the voltage is fed via several conductive dots 6 as shown in FIG. 2 or via several conductive particles, which are ramdomly dispersed in the epoxy sealing material as shown FIG. 3. The distance between the center of the substrate and the conductive location is greatly reduced, in comaprison with the prior art where the distance from the four corner silver dots to the center of the substrate is long. Thus, a liquid crystal display having a more evenly distributed Vcom level in the counter electrode can be obtained.

Figure 6:
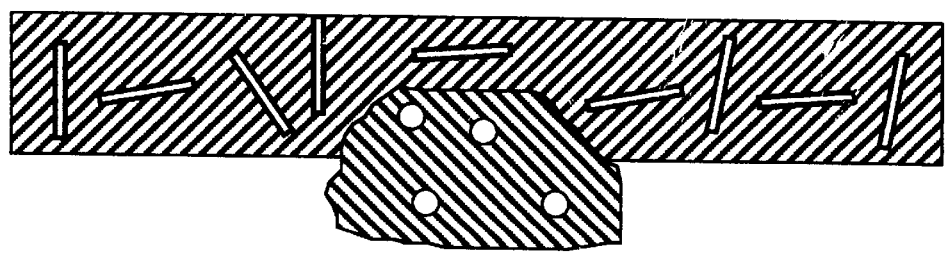
FIG. 6 shows an enlarged picture of the epoxy line with the notch after the conductive particles are compressed.

The enlarged area of the notch in the epoxy line is shown in FIG. 5. The width of the epoxy before pressing is about 300 to 350 um. The width of the epoxy is increased from 350 to 1300 um after pressing of the top and bottom glass substrates. Once the epoxy and silver paste are compressed, they spread into each other and form a continuous pattern with a similar width as shown in FIG. 6 and with connecting points 6 at certain designed locations as shown in FIG. 2. The dots of silver paste can be replaced by electrical conducting paste made of electrical conducting spheres (for example, AU-205 by Sekisui) mixed with the same epoxy materials used in the seal. The conductive particle size can be in a range from 3 um to 15 um in diameter, depending on the cell gap of the liquid crystal cell. The concentration of the conducting particle in the paste can be in the range from 0.1 to 40 wt %, preferably from 0.5 to 10 wt %.

In another embodiment as shown in FIG. 3, the epoxy, spacer rod (or sphere) and electrical conducting spheres are mixed. Then the electrical connection can be made at arbituary locations along the epoxy seal line.

After the two substrates are aligned and fixed by curing epoxy, the structure can be separated into a number of cells or panels either by scribing and breaking method, or by dicing as is commonly practiced in conventional liquid crystal cell fabrication.

While the foregoing embodiments describe conducting media of spheres and rods, the shape is not limited to these two kinds. Other shapes of conducting media are also within the scope of this invention.

What is claimed is:

1. A method of fabricating a liquid crystal cell having a top glass plate and a bottom glass plate for sandwiching liquid crystals, comprising the steps of:

applying sealing adhesive for a seal surrounding said liquid crsytals, depositing alignment films on said glass plate and said bottom glass plate, aligning said alignment films on said top glass plate and said bottom glass plate, dispersing spacer particles on said bottom plate, compressing said spacer particles to form a continuous pattern connecting said top glass plate with said bottom glass plate, cutting a notch in said seal, and filling said notch with epoxy having conducting particles which functions as a part of said seal.

2. A method of fabricting a liquid crystal display cell as described in claim 1, wherein said seal is formed by dispensing method.

3. A method of fabricating a liquid crystal display cell as described in claim 2, wherein said adhesive is premixed with spheres of predetermined diameter to assure the accuracy of the gap between the top glass plate and the bottom glass plate.

4. A method of fabricating a liquid crystal cell as described in claim 1, wherein said conductive particle is any one of silver and a conductive particle mixed with adhesive.

5. A method of fabricating a liquid crystal cell as described in claim 1, wherein said conductive particle is selected from a group consisting of nickel, alloys, and plastic spheres coated with electrical conducting media.

6. A method of fabricating a liquid crystal cell as described in claim 1, wherein said conductive particle is dispensed by any one of a printing method and a dispensing method.

* * * * *